US011951564B2

United States Patent
Stambke et al.

(10) Patent No.: US 11,951,564 B2
(45) Date of Patent: Apr. 9, 2024

(54) METHOD AND COMPUTER PROGRAM PRODUCT FOR OCT MEASUREMENT BEAM ADJUSTMENT

(71) Applicants: TRUMPF Laser-und Systemtechnik GmbH, Ditzingen (DE); TRUMPF Laser GmbH, Schramberg (DE)

(72) Inventors: Martin Stambke, Dunningen (DE); Jan-Patrick Hermani, Markgroeningen (DE); Thomas Notheis, Schramberg (DE); Alexander Sauter, Balingen (DE)

(73) Assignees: TRUMPF Laser- und Systemtechnik Gm H, Ditzingen (DE); TRUMPF Laser GmbH, Schramberg (DE)

( * ) Notice: Subject to any disclaimer, the term of this patent is extended or adjusted under 35 U.S.C. 154(b) by 282 days.

(21) Appl. No.: 17/292,500

(22) PCT Filed: Nov. 6, 2019

(86) PCT No.: PCT/EP2019/080378
§ 371 (c)(1),
(2) Date: May 10, 2021

(87) PCT Pub. No.: WO2020/094709
PCT Pub. Date: May 14, 2020

(65) Prior Publication Data
US 2022/0016730 A1   Jan. 20, 2022

(30) Foreign Application Priority Data

Nov. 9, 2018 (DE) .......................... 102018219129.8

(51) Int. Cl.
*G01B 9/02* (2022.01)
*B23K 26/03* (2006.01)
(Continued)

(52) U.S. Cl.
CPC .......... *B23K 26/082* (2015.10); *B23K 26/032* (2013.01); *B23K 26/044* (2015.10);
(Continued)

(58) Field of Classification Search
CPC .. B23K 26/082; B23K 26/044; B23K 26/046; B23K 26/032; G01B 9/02091;
(Continued)

(56) References Cited

U.S. PATENT DOCUMENTS 5,521,374 A   5/1996 Cray et al.
5,974,966 A   11/1999 Bruni
(Continued)

FOREIGN PATENT DOCUMENTS

CN   103501954 A   1/2014
CN   103506757 A   1/2014
(Continued)

*Primary Examiner* — Uzma Alam
*Assistant Examiner* — Jonathon Cook
(74) *Attorney, Agent, or Firm* — Laurence A. Greenberg; Werner H. Stemer; Ralph E. Locher

(57) ABSTRACT

A method determines translational and/or rotational deviations between the measurement coordinate system of a measurement mirror scanner and the processing coordinate system of a processing mirror scanner. A measurement beam reflected at a workpiece returns on a path of an incident measurement beam and is captured by a spatially resolving measurement sensor to ascertain spatially resolving information of the workpiece. The reflected measurement beam, in a sensor image of the measurement sensor, is imaged onto a previously known image position. This is accomplished by ascertaining a focal position deviation of the processing beam by scanning with the processing beam, evaluating a laser power detected at grid points, fixing the processing mirror scanner, capturing spatially resolving height information of the pinhole diaphragm by the measurement sen-
(Continued)

sor, and determining a translational deviation between the processing and measurement coordinate systems based on the deviation.

13 Claims, 3 Drawing Sheets

(51) Int. Cl.
| | | |
|---|---|---|
| *B23K 26/044* | (2014.01) | |
| *B23K 26/046* | (2014.01) | |
| *B23K 26/082* | (2014.01) | |
| *B23K 26/242* | (2014.01) | |
| *G01B 9/02091* | (2022.01) | |
| *G01B 11/00* | (2006.01) | |
| *G01B 21/04* | (2006.01) | |

(52) U.S. Cl.
CPC .......... *B23K 26/046* (2013.01); *B23K 26/242* (2015.10); *G01B 9/02091* (2013.01); *G01B 11/002* (2013.01); *G01B 21/045* (2013.01)

(58) Field of Classification Search
CPC ............ G01B 9/02029; G01B 9/02063; G01B 9/02068; G01B 11/002; G01B 21/045
See application file for complete search history.

(56) References Cited

U.S. PATENT DOCUMENTS

| | | | |
|---|---|---|---|
| 9,757,817 B2 * | 9/2017 | Webster | ............. G01B 9/02091 |
| 9,784,562 B2 * | 10/2017 | Lessmueller | ...... G01B 9/02091 |
| 10,773,339 B2 | 9/2020 | Sonner et al. | |
| 11,103,952 B2 * | 8/2021 | Lessmueller | ........ B23K 26/032 |
| 11,167,372 B2 | 11/2021 | Hagenlocher et al. | |
| 11,549,798 B2 * | 1/2023 | Strebel | ................. B23K 26/048 |
| 2014/0027421 A1 | 1/2014 | Notheis | |
| 2016/0278629 A1 | 9/2016 | Schuele | |

FOREIGN PATENT DOCUMENTS

| | | |
|---|---|---|
| CN | 104808581 A | 7/2015 |
| CN | 107771112 A | 3/2018 |
| CN | 108044408 A | 5/2018 |
| DE | 102011006553 A1 | 10/2012 |
| DE | 102015012565 B3 | 10/2016 |
| DE | 102016104318 B3 | 4/2017 |
| EP | 2156918 A1 | 2/2010 |
| JP | 2008196980 A | 8/2008 |
| WO | 9714562 A1 | 4/1997 |

* cited by examiner

METHOD AND COMPUTER PROGRAM PRODUCT FOR OCT MEASUREMENT BEAM ADJUSTMENT

BACKGROUND OF THE INVENTION

Field of the Invention

The invention relates to a method for determining translational and/or rotational deviations between the measurement coordinate system of a measurement mirror scanner, which is tiltable about two axes and deflects a measurement beam, which is generated by a coherence tomography apparatus, for example, two-dimensionally, and the processing coordinate system of a processing mirror scanner, which is tiltable about two axes and deflects both the measurement beam deflected by the measurement mirror scanner and a processing beam two-dimensionally onto a workpiece, wherein the measurement beam reflected at the workpiece returns on the path of the incident measurement beam and is captured by a spatially resolving measurement sensor in order to ascertain spatially resolving information of the workpiece, and wherein, in a zero position of the measurement mirror scanner, the reflected measurement beam, in the sensor image of the measurement sensor, is imaged onto a previously known image position.

Such a method has been disclosed by DE 10 2015 012 565 B3, for example.

For welding fillet weld seams, for example, it is necessary to regulate the relative position between laser focal spot and workpiece. This weld seam position regulation can be effected by means of so-called optical coherence tomography (OCT). This method is based on the basic principle of the interference of light waves and makes it possible to capture height differences along a measurement beam axis in the micrometers range. For this purpose, a laser beam is generated by a coherence tomography apparatus and is split into a measurement beam and a reference beam by means of a beam splitter. The measurement beam is passed on to a measurement arm and impinges on a surface of a workpiece to be processed. At this surface the measurement beam is at least partly reflected and guided back to the beam splitter. The reference beam is passed on to a reference arm and is reflected at the end of the reference arm. The reflected reference beam is likewise guided back to the beam splitter. The superimposition of the two reflected beams is finally detected in order, taking account of the length of the reference arm, to ascertain height information about the surface and/or the current penetration depth of a processing beam into a workpiece.

Prior to being coupled into a common processing scanner, by means of which measurement beam and processing beam can be deflected onto different processing positions, both the processing beam and the measurement beam pass through various optical elements within the processing beam optical system and the measurement beam optical system. Typically it is true that in an initial calibration process the elements of the respective optical systems for measurement beam and processing beam are set in such a way that in the case of a predefined zero position of these optical elements and their assigned deflection devices within said optical systems there is congruence of the processing beam and the measurement beam on the workpiece. However, if a desired target offset of measurement beam position and processing position is then set after the calibration process during the processing process, the deflection devices assigned to the measurement beam optical system and the processing beam optical system, that is to say the processing scanner for jointly deflecting processing beam and measurement beam and an upstream measurement scanner for deflecting the measurement beam, have to be correspondingly adjusted, in which case they leave the original zero position. This has the effect that undesired deviations from a target beam path arise in the processing process, despite preceding calibration processes, after leaving the zero position, with the result that there is no longer congruence between the processing beam and the measurement beam. These deviations in the relative position between the two scanners may be caused by manufacturing-dictated inaccuracies, mounting and various influences, such as e.g. temperature fluctuations during processing. These deviations have to be detected and corrected.

In the method known from DE 10 2015 012 565 B3 cited in the introduction, the measurement beam position on the workpiece upon adoption of the zero positions of the processing and measurement scanners in a preceding calibration method is determined by a long-time exposure in which the measurement beam position on the workpiece is highlighted by an optical marker on the workpiece, said optical marker being detectable by the measurement sensor, and the image position of said optical marking in the sensor image of the measurement sensor is determined and stored. During the calibration process, the measurement beam position can be adjusted exactly to the image center, for example. Alternatively, an offset between the measurement beam position and the image center, said offset being ascertained for the zero position, can be stored and taken into account as a corresponding error value in further calculation or regulation processes. If the processing beam position on the workpiece is subsequently captured in terms of coordinates, then a deviation from the image center represents an undesired relative offset between the processing beam position and the measurement beam position, this offset being able to be ascertained by means of known image evaluation algorithms and being compensated for by position regulation of the measurement scanner. As an alternative to the calibration method, the reflected measurement beam can be deflected back in the direction of the measurement sensor, such that it is possible to identify the actual measurement beam position in the captured sensor image and here, too, an offset is compensated for by position regulation of the measurement scanner.

SUMMARY OF THE INVENTION

The present invention is based on the object, in the method mentioned in the introduction, of determining translational and/or rotational deviations between the processing coordinate system of the processing scanner and the measurement coordinate system of the measurement mirror scanner in a different way.

In the method mentioned in the introduction, the object is achieved according to the invention with regard to a translational deviation by means of the following method steps (a):

ascertaining the x-y focal position deviation of the processing beam relative to the pinhole diaphragm center of a pinhole diaphragm detector arranged on the workpiece support plane by scanning the pinhole diaphragm with the processing beam deflected by the processing mirror scanner in an x-y grid and by evaluating the laser power detected at each of the grid points in accordance with the method outlined in DE 10 2011 006 553 A1, the entire content of which is hereby incorporated by reference, and by fixing the processing mirror scanner in the scan position which has been corrected on the basis of the ascertained x-y focal position deviation, in which scan position the focal position of the processing beam is situated in a predetermined position, in particular in the pinhole diaphragm center;

with the processing mirror scanner fixed in the corrected scan position, capturing spatially resolving height information of the pinhole diaphragm by means of the measurement sensor by scanning the pinhole diaphragm with the measurement beam deflected by the measurement mirror scanner; and determining a translational deviation between the processing and measurement coordinate systems on the basis of the deviation—present in the sensor image of the measurement sensor—between the previously known image position corresponding to the focal position of the processing beam and the pinhole diaphragm center captured from the height information.

According to the invention, the processing beam is aligned exactly with the pinhole diaphragm center and then the pinhole diaphragm is scanned by means of the measurement beam deflected by the measurement mirror scanner. The relative offset in the sensor image between the previously known image position and the pinhole diaphragm center captured in terms of height yields the translational deviation of the two scanner coordinate systems, which can then be compensated for by position regulation of the measurement scanner, for example.

In the method mentioned in the introduction, the object is achieved according to the invention with regard to a rotational deviation by means of the following method steps (b):

deflecting the measurement beam in each case by a positive and a negative fixed magnitude in the workpiece support plane by tilting the processing mirror scanner about one, first tilt axis thereof and, with the processing mirror scanner fixed in each case in these tilted scan positions, capturing a linear height edge arranged at the workpiece support plane by means of the measurement sensor in each case by a line scan of the measurement beam by deflecting the measurement mirror scanner about one, second tilt axis thereof, and ascertaining an axis of the processing coordinate system on the basis of the captured points of intersection of the two line scans with the height edge;

deflecting the measurement beam in each case by a positive and a negative fixed magnitude in the workpiece support plane by tilting the measurement mirror scanner about the other, first tilt axis thereof and, with the measurement mirror scanner fixed in each case in these tilted scan positions, capturing the height edge by means of the measurement sensor in each case by a line scan of the measurement beam by deflecting the processing mirror scanner about the second tilt axis thereof, and ascertaining an axis of the measurement coordinate system on the basis of the captured points of intersection of the two line scans with the height edge; and determining a rotational deviation between the processing and measurement coordinate systems on the basis of the ascertained axes of the processing and measurement coordinate systems.

According to the invention, by means of a line scan of a linear height edge provided on the workpiece support plane, that is to say of a three-dimensional surface feature, and the simultaneous deflection of the measurement and processing mirror scanners in each case about a tilt axis, the rotational deviation of the two scanner coordinate systems is determined, which can then be compensated for by position regulation of the measurement scanner, for example.

The processing and measurement mirror scanners can each comprise a biaxial mirror tiltable about two tilt axes, or two uniaxial mirrors each tiltable about one tilt axis.

Particularly preferably, in method step (a) the pinhole diaphragm detector is arranged on the workpiece support plane in that position in which the processing beam impinges on the workpiece support plane as far as possible at right angles.

With further preference, in method step (a) the previously known image position lies in the image center of the sensor image of the measurement sensor. For this purpose, the previously known image position may have been adjusted exactly to the image center—e.g. during a preceding calibration process.

Advantageously, in method step (b) the positive and negative fixed magnitudes are in each case equal.

Very particular preferably, in method step (b) the height edge is an edge which has either a component arranged on the workpiece support plane, or has been produced previously at a workpiece arranged on the workpiece support plane by material removal by means of the processing beam.

Preferably, the measurement beam reflected at the workpiece is deflected between the measurement mirror scanner and a laser beam generator, in particular coherence tomography apparatus, which emits the measurement beam, in the direction of the measurement sensor.

A translational and/or rotational deviation between the processing and measurement coordinate systems that has been determined according to the invention can be correspondingly corrected by position regulation of the measurement scanner, e.g. by a machine controller.

The invention also relates to a computer program product comprising code means adapted for carrying out all the steps of the method described above when the program is executed on a controller of a laser processing machine.

Further advantages and advantageous configurations of the subject matter of the invention are evident from the description, the claims and the drawings. Likewise, the features mentioned above and those referred to hereinafter can be used in each case by themselves or as a plurality in any desired combinations. The embodiments shown and described should not be understood as an exhaustive enumeration, but rather are of exemplary character for outlining the invention.

DETAILED DESCRIPTION OF THE INVENTION

Figure 1:
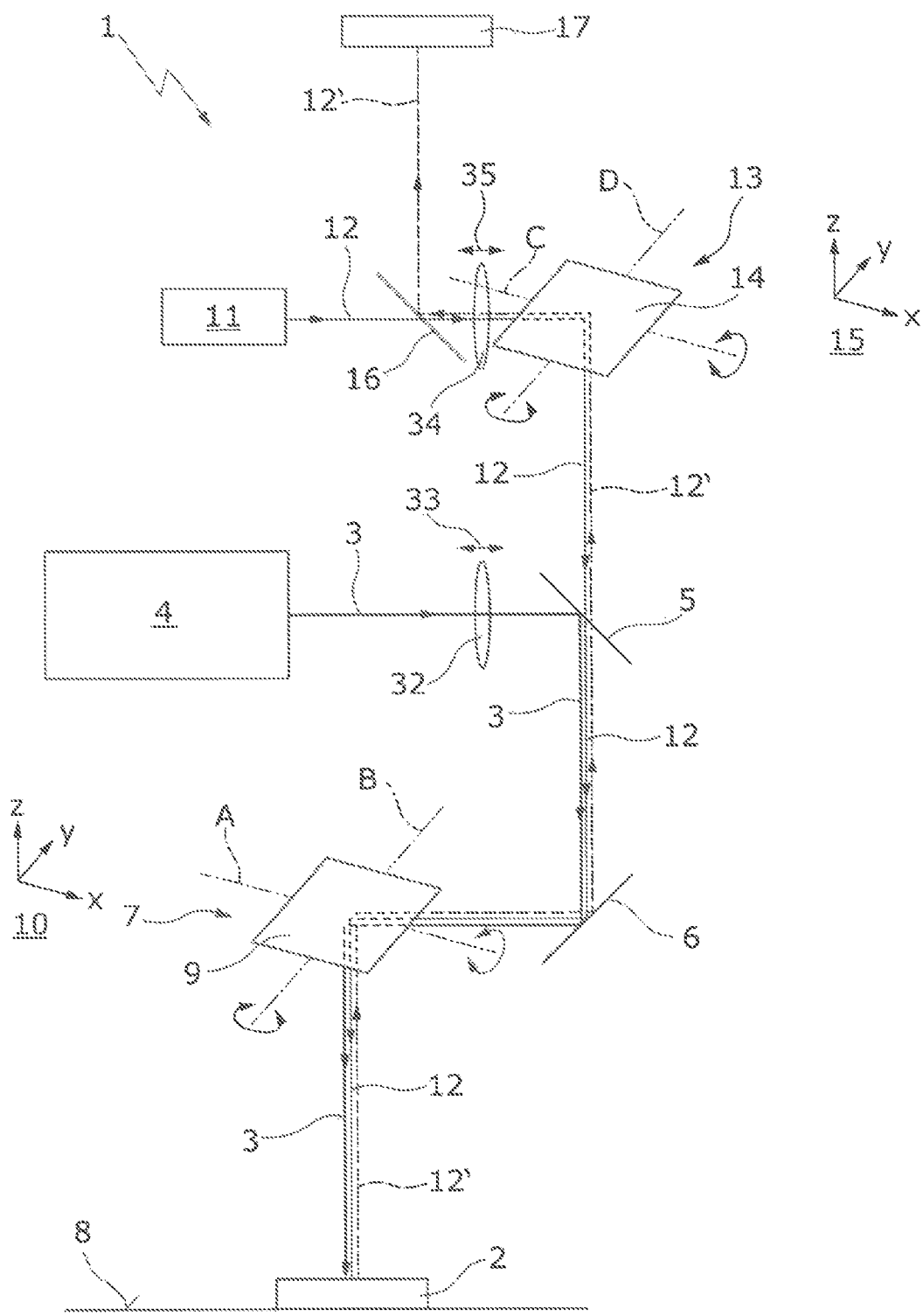
FIG. 1 schematically shows a laser processing machine suitable for carrying out the method according to the invention for determining translational and/or rotational deviations between the coordinate systems of a processing mirror scanner and of a measurement mirror scanner.

The laser processing machine 1 shown in FIG. 1 serves for processing workpieces 2 by means of a (laser) processing beam 3.

The laser processing machine 1 comprises a laser beam generator 4 for generating the processing beam 3, a first deflection mirror 5, which deflects the processing beam 3 by e.g. 90°, an optional second deflection mirror 6, which deflects the processing beam 3 once again by e.g. 90°, and a processing mirror scanner 7 for deflecting the processing beam 3 two-dimensionally in the direction of a workpiece 2 arranged on a workpiece support plane 8. In the exemplary embodiment shown, the processing mirror scanner 7 is embodied as a mirror 9 tiltable about two tilt axes A, B, i.e. a biaxial mirror, but can alternatively also be formed by two mirrors each tiltable about only one tilt axis A, B, i.e. uniaxial mirrors. The processing coordinate system defined by the two tilt axes A, B is designated by 10.

The laser processing machine 1 furthermore comprises a coherence tomography apparatus as measurement beam generator 11 for generating an OCT (laser) measurement beam 12, illustrated in a dashed manner, and a measurement mirror scanner 13 for deflecting the measurement beam 12 two-dimensionally onto the first deflection mirror 5, which is transmissive to the measurement beam 12 on both sides. In the exemplary embodiment shown, the measurement mirror scanner 13 is embodied as a mirror 14 tiltable about two tilt axes C, D, i.e. a biaxial mirror, but can alternatively also be formed by two mirrors each tiltable about only one tilt axis C, D, i.e. uniaxial mirrors. The measurement coordinate system defined by the two tilt axes C, D is designated by 15. The tilt axes A and C run parallel to one another, in the X-direction in the exemplary embodiment shown, and the tilt axes B and D run parallel to one another, in the Y-direction in the exemplary embodiment shown.

In FIG. 1, both the processing scanner 7 and the measurement scanner 13 are shown in their so-called zero position. That is to say that the two axes A, B and C, D of the respective scanners 7, 13 each adopt a neutral reference position (zero position) shown in FIG. 1, in which position they do not effect targeted beam deflections. In the zero position of the measurement scanner 13, the measurement beam 12 is coupled into the processing beam 3 collinearly at the first deflection mirror 5. At the processing mirror scanner 7, both the processing beam 3 and the measurement beam 12 are then deflected two-dimensionally in the direction of the workpiece 2.

The laser processing machine 1 furthermore comprises a deflection mirror 16 arranged between measurement beam generator 11 and measurement mirror scanner 13, said deflection mirror being transmissive to the measurement beam 12 coming from the measurement beam generator 11. The measurement beam 12' reflected at the workpiece 2 returns on the path of the incident measurement beam 12 and is deflected onto a spatially resolving measurement sensor 17 by the deflection mirror 16, which is non transmissive or partly transmissive in this direction. In the zero position of the measurement mirror scanner 13, the reflected measurement beam 12', in the sensor image 18 (FIG. 3) of the measurement sensor 17, is imaged onto a previously known image position 19, merely by way of example the image center in FIG. 3.

Figure 2A:
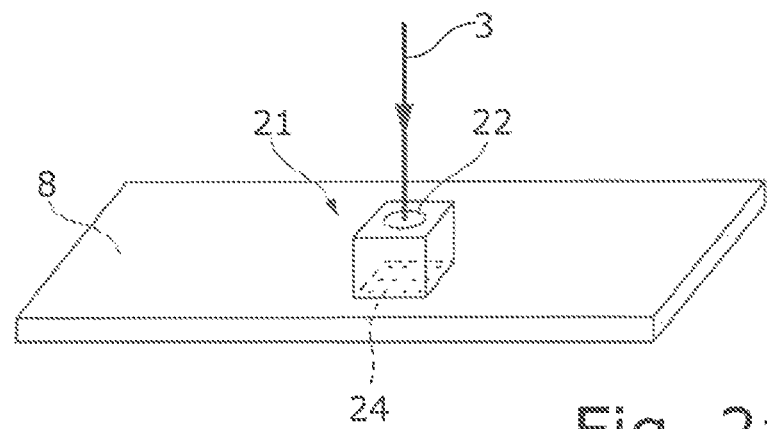
FIGS. 2a, 2b show a pinhole diaphragm detector arranged on a workpiece support plane for ascertaining an x-y focal position deviation of a processing beam in a perspective view (FIG. 2a) and in a plan view (FIG. 2b)
Figure 2B:
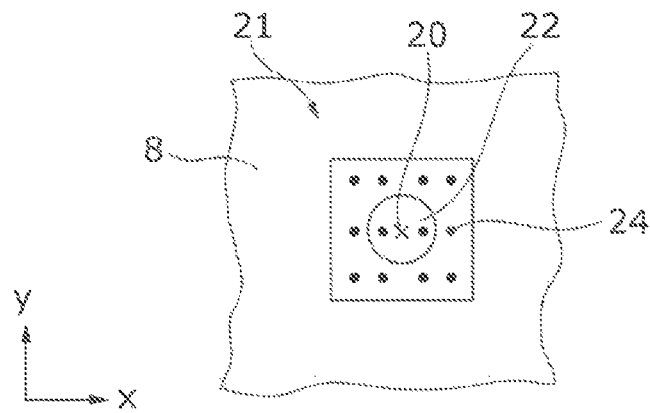

In order to determine a translational deviation between the processing and measurement coordinate systems 10, 15, the following procedure is implemented:

As shown in FIGS. 2a, 2b, firstly an x-y focal position deviation of the processing beam 3 relative to the pinhole diaphragm center 20 of a pinhole diaphragm detector 21 arranged on the workpiece support plane 8 is ascertained according to the method known from DE 10 2011 006 553 A1. This is effected by scanning the pinhole diaphragm 22 with the processing beam 3 deflected by the processing mirror scanner 7 in an x-y grid and by evaluating the laser power detected at each of the grid points 23 by a detector area 24 downstream of the pinhole diaphragm 20. The processing mirror scanner 7 is then fixed in the scan position which has been corrected on the basis of the ascertained x-y focal position deviation, in which scan position the focal position of the processing beam 3 is situated exactly in the pinhole diaphragm center 18.

With the processing mirror scanner 7 fixed in this way, the height of the pinhole diaphragm 22 is captured in a spatially resolving manner by means of the measurement sensor 17 by scanning the pinhole diaphragm 22 with the measurement beam 12 deflected by the measurement mirror scanner 13.

Figure 3:
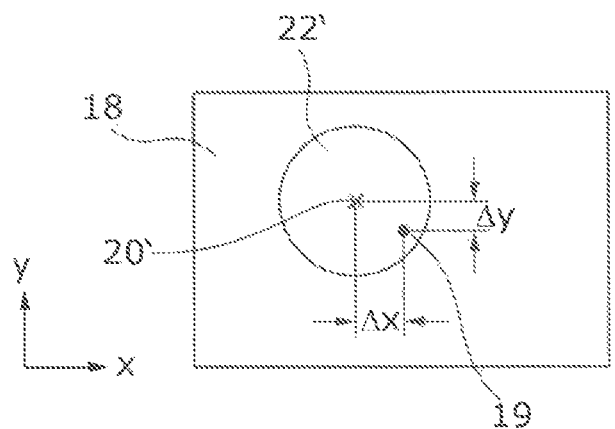
FIG. 3 shows the sensor image of a spatially resolving measurement sensor for determining a translational deviation between the processing and measurement coordinate systems.

As shown in FIG. 3, on the basis of the deviation—present in the sensor image 18 of the measurement sensor 17—between the previously known image position 19 corresponding to the focal position of the processing beam 3 and the pinhole diaphragm center 20' of the pinhole diaphragm 22' captured in terms of height, a translational deviation $\Delta x$, $\Delta y$ between the processing and measurement coordinate systems 10, 15 can be determined.

Preferably, the pinhole diaphragm detector 21 is arranged on the workpiece support plane 8 where the processing beam 3 impinges on the workpiece support plane 8 as far as possible at right angles.

Figure 4A:
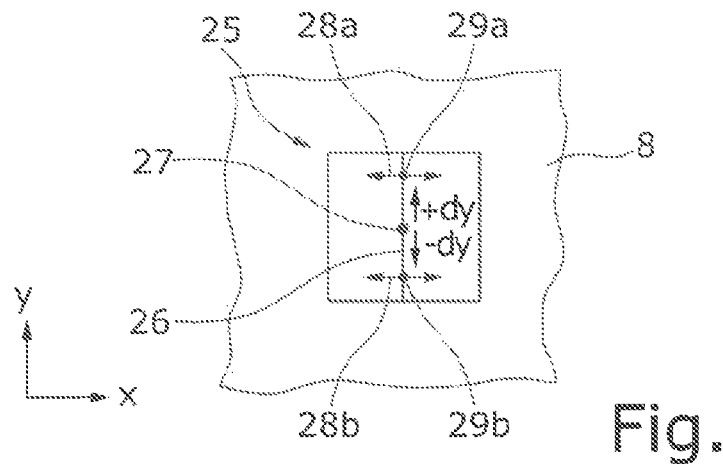
FIGS. 4a, 4b show a height edge arranged on a workpiece support plane for ascertaining the y-axis of a processing coordinate system (FIG. 4a) and for ascertaining the y-axis of a measurement coordinate system (FIG. 4b)

In order to determine a rotational deviation about the Z-axis between the processing and measurement coordinate systems 10, 15, the following procedure is implemented:

As shown in FIG. 4a, firstly a component 25 having a linear height edge 26 is placed on the workpiece support plane 8, specifically at 27, where the measurement beam 12 impinges on the workpiece support plane 8 in the zero positions of the processing and measurement mirror scanners 7, 13. Instead of being formed on a separate component 25, the height edge 26 can also be formed on the pinhole diaphragm detector 21.

Figure 5:
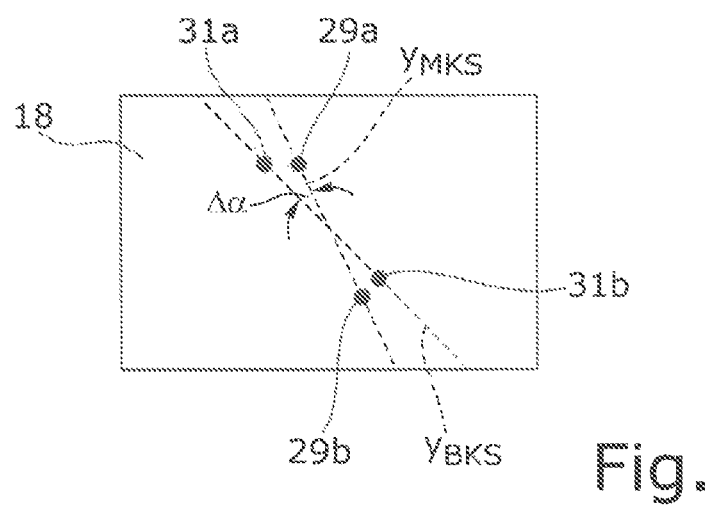
FIG. 5 shows the sensor image of a spatially resolving measurement sensor for determining a rotational deviation between the processing and measurement coordinate systems.

In a first step, as is furthermore shown in FIG. 4a, the measurement beam 12 is deflected in each case by a positive and a negative fixed magnitude +dy, −dy in the workpiece support plane 8 by tilting the processing mirror scanner 7 about the tilt axis A and, with the processing mirror scanner 7 fixed in each case in these tilted scan positions, the height edge 26 is captured by means of the measurement sensor 17 in each case by a line scan 28a, 28b of the measurement beam 12 by deflecting the measurement mirror scanner 13 about the tilt axis D. As shown in FIG. 5, the $y_{BKS}$-axis of the processing coordinate system 10 can then be ascertained in the sensor image 18 of the measurement sensor 17 on the basis of the points of intersection 29a, 29b—imaged there— of the two line scans 28a, 28b with the height edge 26.

Figure 4B:
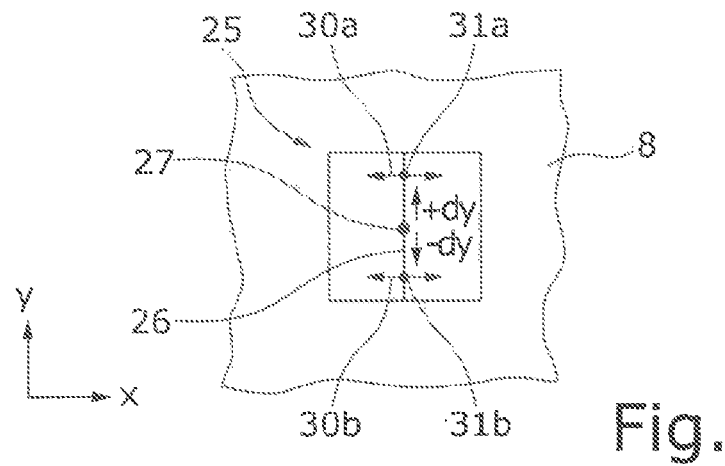

In a second step, as shown in FIG. 4b, the measurement beam 12 is deflected in each case by a positive and a negative fixed magnitude +dy, −dy in the workpiece support plane 8 by tilting the measurement mirror scanner 13 about the tilt axis C and, with the measurement mirror scanner 13 fixed in each case in these tilted scan positions, the height edge 26 is captured by means of the measurement sensor 17 in each case by a line scan 30a, 30b of the measurement beam 12 by deflecting the processing mirror scanner 7 about the tilt axis B. As likewise shown in FIG. 5, the $y_{MKS}$-axis of the measurement coordinate system 15 can then be ascertained in the sensor image 18 of the measurement sensor 17 on the basis of the points of intersection 31a, 31b—imaged there—of the two line scans 30a, 30b with the height edge 26.

In a third step, as shown in FIG. 5, a rotational deviation $\Delta\alpha$ between the processing and measurement coordinate systems 10, 15 is determined on the basis of the angle of intersection of the ascertained axes $y_{BKS}$, $y_{MKS}$ of the processing and measurement coordinate systems 10, 15.

The translational and rotational deviations $\Delta x$, $\Delta y$, $\Delta \alpha$ thus determined can be corrected for example by a machine controller of the laser processing machine 1 by displacement and rotation of the measurement mirror scanner 13.

Instead of the height edge 26 being provided on the component 25 or on the pinhole diaphragm detector 21, the linear height edge 26 can also be generated on a workpiece 2 situated on the workpiece support plane 8 directly by means of a laser removal process, for example parallel to the B, D axes.

The processing and measurement mirror scanners 7, 13 can also be embodied as 3D scanners, instead of as 2D scanners as described above, and so the respective laser focus can also be adjusted along the processing and measurement beams 3, 12, respectively, that is to say in the Z-direction. For this purpose, a collimation lens 32 is arranged in the beam path of the processing beam 3 between the laser beam generator 4 and the processing mirror scanner 7, here merely by way of example between the laser beam generator 4 and the first deflection mirror 5, said collimation lens being displaceable by means of a controlled axis 33 along the processing beam 3. A collimation lens 34 is arranged in the beam path of the measurement beam 12 between the measurement beam generator 11 and the measurement mirror scanner 13, here merely by way of example between the deflection mirror 16 and the measurement mirror scanner 13, said collimation lens being displaceable by means of a controlled axis 35 along the measurement beam 12.

The invention claimed is:

1. A method for determining translational or rotational deviations between a measurement coordinate system of a measurement mirror scanner being tiltable about two axes and deflecting a measurement beam two-dimensionally, and a processing coordinate system of a processing mirror scanner being tiltable about two axes and deflecting both the measurement beam deflected by the measurement mirror scanner and a processing beam two-dimensionally onto a workpiece, the method comprising:
returning the measurement beam reflected at the workpiece on a path of the incident measurement beam and capturing the returned measurement beam by a spatially resolving measurement sensor to ascertain spatially resolving information of the workpiece, and in a zero position of the measurement mirror scanner, imaging the reflected measurement beam in a sensor image of the measurement sensor, onto a previously known image position;
ascertaining an x-y focal position deviation of the processing beam relative to a pinhole diaphragm center of a pinhole diaphragm detector disposed on a workpiece support plane by scanning the pinhole diaphragm with the processing beam deflected by the processing mirror scanner in an x-y grid and by evaluating a laser power detected at each of grid points, and by fixing the processing mirror scanner in a scan position having been corrected based on the ascertained x-y focal position deviation, the focal position of the processing beam in the scan position being situated in a predetermined position;
capturing spatially resolving height information of the pinhole diaphragm, with the processing mirror scanner fixed in a corrected scan position, by using the measurement sensor to scan the pinhole diaphragm with the measurement beam deflected by the measurement mirror scanner; and
determining the translational deviation between the processing and measurement coordinate systems based on a deviation between the previously known image position corresponding to the focal position of the processing beam and the pinhole diaphragm center captured from the height information, being present in the sensor image of the measurement sensor.

2. The method according to claim 1, which further comprises providing the predetermined position as the pinhole diaphragm center of the pinhole diaphragm detector.

3. The method according to claim 1, which further comprises providing each of the processing mirror scanner and the measurement mirror scanner with one respective mirror tiltable about two tilt axes or two mirrors each tiltable about one tilt axis.

4. The method according to claim 1, which further comprises in step placing the pinhole diaphragm detector on the workpiece support plane where the processing beam impinges on the workpiece support plane at right angles.

5. The method according to claim 1, which further comprises:
deflecting the measurement bean by respective positive and negative fixed magnitudes in the workpiece support plane by titling the processing mirror scanner about one, first tilt axis thereof and, with the processing mirror scanner fixed in the respective titled scan positions, capturing a linear height edge disposed at the workpiece support plane by using the measurement sensor for a respective line scan of the measurement beam by deflecting the measurement mirror scanner about one, second tilt axis thereof, and ascertaining an axis of the processing coordinate system based on captured points of intersection of the two line scans with the height edge;
deflecting the measurement beam by respective positive and negative fixed magnitudes in the workpiece support plane by tilting the measurement mirror scanner about the other, first tilt axis thereof and, with the measurement mirror scanner fixed in the respective tilted scan positions, capturing the height edge by using the measurement sensor for respective line scans of the measurement beam by deflecting the processing mirror scanner about the second tilt axis thereof;
ascertaining an axis of the measurement coordinate system based on the captured points of intersection of the two line scans with the height edge; and
determining a rotational deviation between the processing and measurement coordinate systems based on the ascertained axes of the processing and measurement coordinate systems.

6. The method according to claim 5, which further comprises setting the positive and negative fixed magnitudes to be equal.

7. The method according to claim 5, which further comprises before the step of deflecting the measurement bean by respective positive and negative fixed magnitudes in the workpiece support plane by titling the processing mirror scanner about one, first tilt axis thereof, placing a component having the height edge on the workpiece support plane.

8. The method according to claim 5, which further comprises before the step of deflecting the measurement bean by respective positive and negative fixed magnitudes in the workpiece support plane by titling the processing mirror scanner about one, first tilt axis thereof, producing the height edge at a workpiece disposed on the workpiece support plane by material removal provided by the processing beam.

9. The method according to claim 1, which further comprises in step deflecting the measurement beam, reflected at the workpiece, between the measurement mirror scanner and a laser beam generator emitting the measurement beam in a direction of the measurement sensor.

10. The method according to claim 9, which further comprises providing a coherence tomography apparatus as the laser beam generator.

11. The method according to claim 1, which further comprises compensating for the determined translational or rotational deviation by position regulation of at least one of the processing mirror scanner or the measurement mirror scanner.

12. A non-transitory computer-readable medium with instructions stored thereon, that perform the steps of claim 1 when executed on a processor of a laser processing machine.

13. The method according to claim 1, which further comprises locating the previously known image position in an image center of the sensor image.

* * * * *